US010432687B1

(12) United States Patent
Hanes et al.

(10) Patent No.: US 10,432,687 B1
(45) Date of Patent: Oct. 1, 2019

(54) BIOMETRIC MASKING

(71) Applicant: Cisco Technology, Inc., San Jose, CA (US)

(72) Inventors: M. David Hanes, Lewisville, NC (US); Joseph Michael Clarke, Raleigh, NC (US); Gonzalo Salgueiro, Raleigh, NC (US); Charles Calvin Byers, Wheaton, IL (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/983,724

(22) Filed: May 18, 2018

(51) Int. Cl.
| H04L 29/06 | (2006.01) |
| H04N 7/15 | (2006.01) |
| G06K 9/00 | (2006.01) |
| G06T 13/40 | (2011.01) |
| G06T 5/40 | (2006.01) |
| G06T 5/00 | (2006.01) |

(52) U.S. Cl.
CPC .......... *H04L 65/601* (2013.01); *G06K 9/0061* (2013.01); *G06K 9/00315* (2013.01); *G06T 5/008* (2013.01); *G06T 5/40* (2013.01); *G06T 13/40* (2013.01); *H04L 65/1089* (2013.01); *H04L 65/1093* (2013.01); *H04L 65/80* (2013.01); *H04N 7/157* (2013.01); *G06T 2207/10024* (2013.01); *G06T 2207/30201* (2013.01)

(58) Field of Classification Search
USPC ...................................................... 348/14.01
See application file for complete search history.

(56) References Cited

U.S. PATENT DOCUMENTS

| 7,825,950 | B2 | 11/2010 | Rottmann |
| 8,413,218 | B1 | 4/2013 | Hopkins et al. |
| 9,640,218 | B2 | 5/2017 | Shoemaker et al. |
| 2008/0068397 | A1 | 3/2008 | Carey et al. |
| 2010/0266045 | A1* | 10/2010 | Katzur ................. H04N 19/176 |
| | | | 375/240.16 |
| 2013/0139258 | A1 | 5/2013 | Tegreene |
| 2013/0139259 | A1* | 5/2013 | Tegreene ................. A61B 5/16 |
| | | | 726/22 |

(Continued)

FOREIGN PATENT DOCUMENTS

WO   2017/106454 A1   6/2017

OTHER PUBLICATIONS

Huang, Haoda et al.; "Leveraging motion capture and 3D scanning for high-fidelity facial performance acquisition", Journal, ACM Transactions on Graphics (TOG), vol. 30, Issue 4, Jul. 2011, Article No. 74, 10 pages.

(Continued)

*Primary Examiner* — Maria El-Zoobi
(74) *Attorney, Agent, or Firm* — Edell, Shapiro & Finnan, LLC (57) ABSTRACT

Biometric masking includes testing video data and/or audio data from the video conference for biometric markers indicative of emotion or stress levels. If at least one of the biometric markers is detected with the testing, the video data and/or the audio data is edited to obfuscate the at least one of the biometric markers so that the video data and the audio data is transmitted to participants of the video conference with the at least one of the biometric markers obfuscated.

20 Claims, 6 Drawing Sheets

(56) References Cited

U.S. PATENT DOCUMENTS

2014/0267919 A1    9/2014  Heller et al.

OTHER PUBLICATIONS

Garrido, Pablo et al.; "Vdub: Modifying face video of actors for plausible visual alignment to a dubbed audio track", Eurographics 2015, vol. 34 (2015), No. 2, May 2015, 12 pages.
Vlasic, Daniel et al.; "Face transfer with multilinear models", TR2005-048, Jul. 2005, Mitsubishi Electric Research Laboratories, http://www.merl.com, 10 pages.
Garrido, Pablo et al.; "Automatic face reenactment", In Proceedings of the IEEE Conference on Computer Vision and Pattern Recognition, pp. 4217-4224. 8 pages, 2014.
Venneti, Satya; "Real-Time Extraction of Biometric Data from Video"; SEI Insights; Carnegie Mellon University; Aug. 2017; available at: https://insights.sei.cmu.edu/sei_blog/2017/08/real-time-extraction-of-biometric-data-from-video-1.html, 5 pages.
Wu, Hao-Yu et al.; "Eulerian video magnification for revealing subtle changes in the world"; 2012, 8 pages.
Raja, Rohan; "Detecting Breathing Rate of a Person from Video"; Algomuse.com; viewed Jan. 2018; available at: http://algomuse.com/c-c/detecting-breathing-rate-of-a-person-from-video, 6 pages.
Tveit, D.M., et al.; "Motion based detection of respiration rate in infants using video", 2016 IEEE International Conference on Image Processing (ICIP), Phoenix, AZ, 2016, pp. 1225-1229., 5 pages.
Higginbotham, Adam; "Deception is Futile when Big Brother's Lie Detector Turns its Eyes on You"; Wired; Jan. 2013; available at: https://www.wired.com/2013/01/ff-lie-detector/, 17 pages.
Wikipedia; "Voice stress analysis", Wikipedia, The Free Encyclopedia, https://en.wikipedia.org/w/index.php?title=Voice_stress_analysis&oldid=803871594;accessed Feb. 1, 2018, 2 pages.
"Create a Digital Copy of Voice"; Welcome to the Beta Version of Lyrebird 2017; [Viewed Jan. 2018]; Available at: https://lyrebird.ai, 1 page.
Gholipour, Bahar; "New AI Tech Can Mimic any Voice"; Scientific American May 2017; available at: https://www.scientificamerican.com/article/new-ai-tech-can-mimic-any-voice/, 8 pages.
Thies, Justus et al.; "Real-time expression transfer for facial reenactment." ACM Trans. Graph. 34, No. 6 (2015): 183-1, 14 pages.
Chang, Ya et al.; "Automatic 3D Facial Expression Editing in Videos." ; viewed Jan. 2018, 8 pages.
Blanz, Volker et al.; "Reanimating faces in images and video"; in Computer graphics forum, vol. 22, No. 3, pp. 641-650. Blackwell Publishing, Inc, 2003, 10 pages.
Malleson, Charles et al.; "FaceDirector: continuous control of facial performance in video." In Proceedings of the IEEE International Conference on Computer Vision, pp. 3979-3987. 2015, 9 pages.
R. Ravichandran, et al., "WiBreathe: Estimating Respiration Rate Using Wireless Signals in Natural Settings in the Home", 2015 IEEE International Conference on Pervasive Computing and Communications (PerCom), Mar. 23-27, 2015, St. Louis, MO, 9 pages.

* cited by examiner

BIOMETRIC MASKING

TECHNICAL FIELD

The present disclosure generally relates to masking of biometric markers in a collaborative video environment.

BACKGROUND

In at least some instances, biometric data has been extracted from video as a means for authenticating an individual's identity. In fact, recent advances have even used biometric data as a real-time indicator of the emotional state of participants in an ongoing video conference. For example, biometric indicators, or "markers" extracted from video using Eulerian video magnification may be used to determine a pulse rate for a participant in a video conference. The pulse rate for the participant's heart may be determined through video processing methods that detect a subtle face flush with each heartbeat, and the heartrate may be useful in inferring emotional states. Other biometric markers that may be extracted from video include micro-expressions (subtle facial muscle movements that may represent otherwise unnoticeable indications of an individual's emotions), respiration rates, pupil tracking, and voice stress levels. However, in at least some instances, participants in a collaboration session may not approve or be aware of biometric marker extraction techniques being applied during the session.

BRIEF DESCRIPTION OF THE DRAWINGS

The embodiments of the disclosure will be understood and appreciated more fully from the following detailed description, taken in conjunction with the drawings.

DESCRIPTION OF EXAMPLE EMBODIMENTS

Overview

Presented herein are techniques for biometric masking. These techniques may be embodied as a method, an apparatus, a system, and executable instructions in a computer-readable storage media to perform the method, and may be used, for example, to edit video data and/or audio data during a video conferencing session.

According to one example embodiment, biometric masking includes testing video data and/or audio data from the video conference for biometric markers indicative of emotion or stress levels. If at least one of the biometric markers is detected with the testing, the video data and/or the audio data is edited to obfuscate the at least one of the biometric markers so that the video data and the audio data is transmitted to participants of the video conference with the at least one of the biometric markers obfuscated.

Example Embodiments

Generally, the techniques presented herein may process video and/or audio data to detect and replace biometric markers in outgoing video and/or audio data in order to mask the emotional state of a video conference participant. Generally, biometric markers extracted from the video and/or audio data of a video conference may be indicative of emotional signatures representing the mood, stress level, sincerity/honesty, etc. of a video conference participant. However, in at least some instances, these biometric markers may be collected from a participant without the participant's knowledge and/or consent. Accordingly, while a first video conference participant may benefit from biometric markers of a second video conference participant extracted during a conversation, negotiation, or other such critical discussion, the second video conference participant may suffer a distinct disadvantage in the same conversation, negotiation, or other such critical discussion, and be unable to discover the cause of their disadvantage. That is, the first video conference participant may have a distinct advantage and the second video conference participant may be unable to correct the imbalance. The techniques presented herein resolve, or at least begin to resolve, this imbalance.

Figure 1:
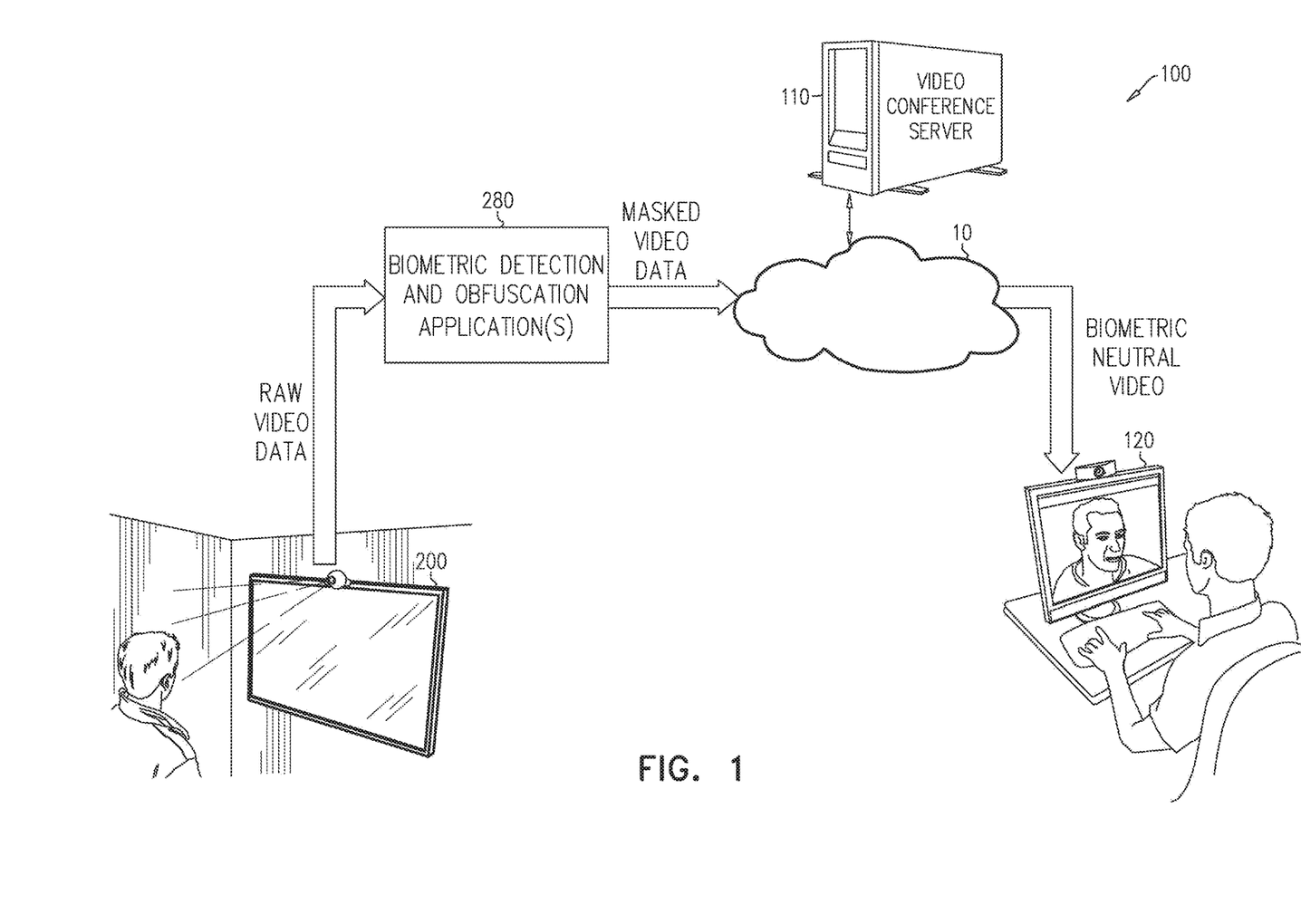
FIG. 1 is a diagram depicting an exemplary biometric detection and masking system, according to an example embodiment.

Reference is now made to FIG. 1, for a description of a biometric detection and masking system 100 (hereinafter referred to also as "system 100") that may employ the techniques presented herein. As described herein, system 100 may be operative to process video and/or audio data to detect and replace biometric markers in outgoing video and/or audio data in order to mask the emotional state of a video conference participant.

System 100 comprises video conference server 110, video conference client terminal 120, and video conference terminal 200 which are arranged to provide video conference services between users located in the vicinity of video conference terminals 120 and 200. Video conference server 110 may use any techniques now known or developed hereafter to facilitate a video conference over communications network 10 between a user of video conference terminal 120 and a user of video conference terminal 200. For example, video conference server 110 may be a TelePresence™ server or WebEx® server to which video conference terminals 120 and 200 may connect over the Internet.

It will also be appreciated that the depiction of video conference terminal 120 as implemented on a personal computer in FIG. 1 is exemplary. The depiction of video conference terminal 200 as a wall mounted dedicated video conference unit is similarly exemplary. The embodiments described herein may support any suitable implementation of either of video conference terminals 120 and 200, including, for example, personal computers, dedicated conferencing units, mobile devices, dedicated conference rooms, etc. Also, although two video conference terminals are shown in FIG. 1, it should be appreciated that video conferencing networks may include larger numbers of terminals connecting to the same video conference (e.g., two or more terminals).

System 100 also comprises one or more biometric detection and obfuscation applications 280 (hereinafter referred to also as "application(s) 280"). As will be described herein, applications 280 comprise one or more applications that are configured to detect biometric markers in raw video and/or audio data, and then to obfuscate the detected biometric markers, thereby producing "masked" video and/or audio data where the emotional signature is not discernible. For example, as per the exemplary embodiment of FIG. 1, application(s) 280 may be arrayed between video conference terminal 200 and the communications network 10. The user of video conference terminal 200 may wish to mask biometric markers that may otherwise be included in his/her outgoing audio/video feed. Accordingly, application(s) 280 may be configured to intercept the raw data associated with the outgoing audio/video feed, detect biometric markers in the raw data, and obfuscate the detected biometric markers, thereby producing masked video and/or audio data. The masked data may ultimately be received at video conference terminal 120 as biometric neutral video and/or audio, thereby preventing the user of video conference terminal 120 from using the incoming (biometric neutral) data from making inferences about the emotional state of the user of video conference terminal 200.

As such, application(s) 280 may effectively filter the raw video and/or audio data to remove biometric markers, while preserving the basic "feel" of an ongoing video conference. The resulting masked video and/or audio data may then be sent as part of the ongoing video conference to a remote endpoint (e.g., video conference terminal 120). The masked video and/or audio received by the remote endpoint may be largely biometrically neutral. Thus, even if the remote endpoint has or is associated with biometric analytics algorithms for the detection/extraction of biometric markers, the biometric analytics algorithms may be unable to extract meaningful information regarding the emotional state of the user of video conference terminal 200.

Still referring to FIG. 1, although application(s) 280 is depicted as a separate module positioned between video conference terminal 200 and communications network 10, this is merely exemplary. The embodiments described herein may support other implementations of application(s) 280; for example, application(s) 280 may be implemented as an integrated component of video conference terminal 200. Application(s) 280 may also be implemented as an integrated or peripheral component of video conference server 110.

Figure 2:
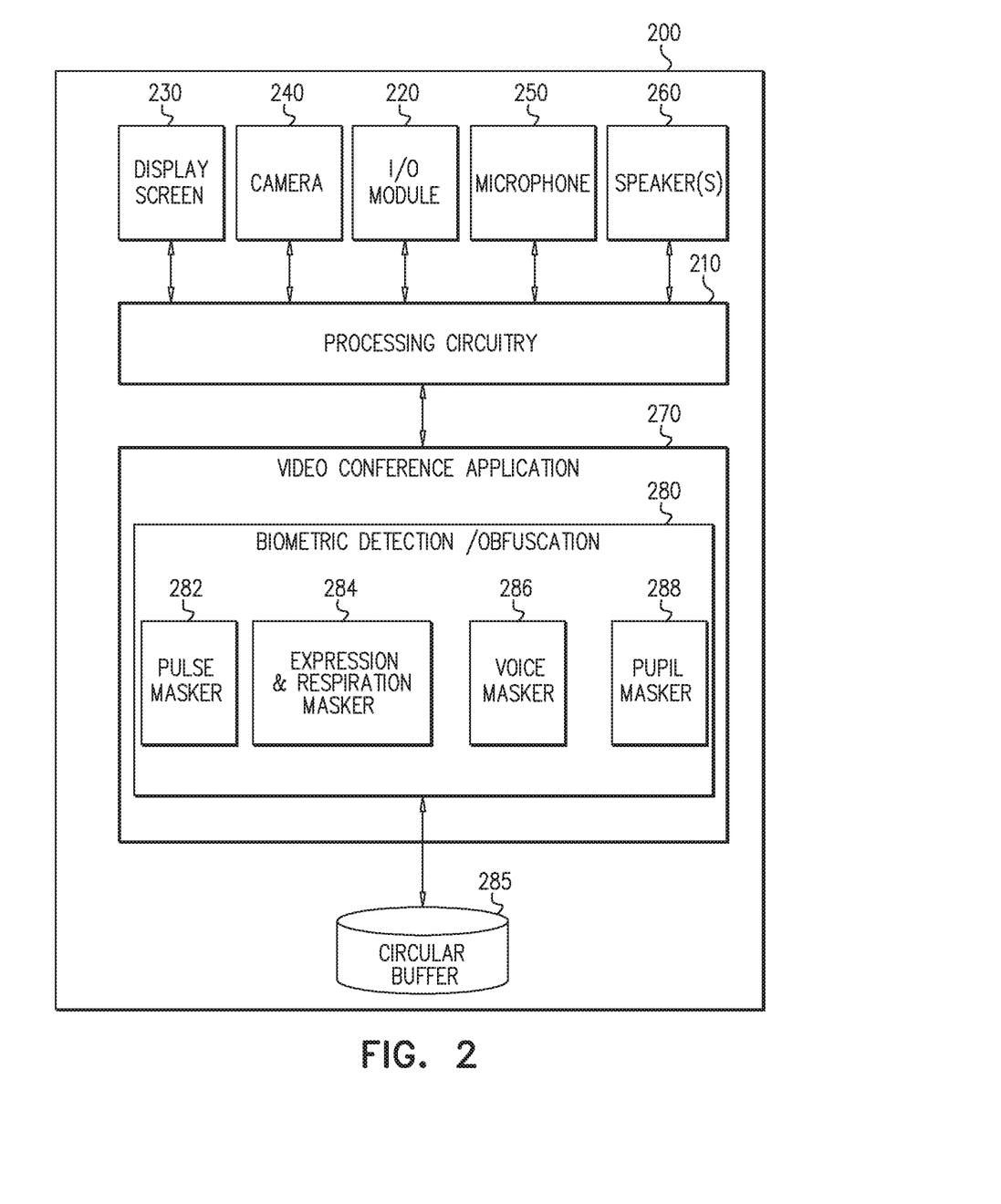
FIG. 2 is a block diagram of an exemplary computing device from the system of FIG. 1.

Reference is now made also to FIG. 2 which is a block diagram of an exemplary video conference terminal 200 from system 100 (FIG. 1). Video conference terminal 200 may be implemented on any suitable computing device such as, for example, a smartphone, a personal computer, a dedicated video conferencing device, and integrated video conference room. Video conference terminal 200 comprises processing circuitry 210, input/output (I/O) module 220, display screen 230, camera 240, microphone 250, speaker(s) 260 and video conference application 270. Video conference application 270 may be instantiated in a suitable memory for storing software such as, for example, an optical storage medium, a magnetic storage medium, an electronic storage medium, and/or a combination thereof. The memory, or parts thereof, may be implemented as a physical component of video conference application 270 and/or as a physical component of one or more secondary devices in communication with video conference terminal 200. Moreover, for clarity, while video conference terminal 200 may comprise additional components and/or functionality, such additional components and/or functionality are not depicted in FIG. 2 and/or described herein.

Processing circuitry 210 may be operative to execute instructions stored in memory. For example, processing circuitry 210 may be operative to execute video conference application 270. Processing circuitry 210 may be implemented as a central processing unit (CPU), and/or one or more other integrated circuits such as application-specific integrated circuits (ASICs), field programmable gate arrays (FPGAs), graphics processing units (GPUs), full-custom integrated circuits, etc., or a combination of such integrated circuits. Additionally, video conference terminal 200 may comprise more than one instance of processing circuitry 210. For example, one such instance of processing circuitry 210 may be a special purpose processor operative to execute video conference application 270 to perform some, or all, of the functionality of video conference terminal 200 as discussed with respect to FIG. 1.

I/O module 220 may be any suitable communications component such as a network interface card, universal serial bus (USB) port, disk reader, modem or transceiver that may be operative to use protocols now known or developed hereafter to communicate either directly, or indirectly, with other elements of system 100, such as, for example, video conference terminal 120 and/or video conference server 110. For example, I/O module 220 may be operative to communications network 10 to connect to the other elements of system 100, where communications network 10 may be instantiated as a local area network, a backbone network and/or the Internet, etc. In operation, I/O module 220 may be implemented as a multiplicity of modules, where different modules may be operative to use different communication technologies.

Video conference application 270 may be an application implemented in hardware, firmware, or software that may be executed by processing circuitry 210 to enable a user of videoconference terminal 200 to participate in a video conference, e.g., opposite a user of video conference terminal 120, as depicted in FIG. 1. For example, video conference application 270 may employ display screen 230 to display video images received from video conference terminal 120. Video conference application 270 may similarly employ speaker(s) 260 to play audio signals received from video conference terminal 120 via I/O module 220. Video conference application 270 may also employ camera 240 and microphone 250 to capture audio/video signals to be sent to video conference terminal 120 via I/O module 220.

As depicted in FIG. 2, video conference application 270 comprises biometric detection and obfuscation applications 280. However, the depiction of applications 280 as an integrated component of video conference application 270 may be exemplary. As is discussed with respect to FIG. 1, the embodiments described herein may support implementation of applications 280 in various positions along the flow of video conference data from a sending device (e.g., video conference terminal 200) to a receiving device (e.g., video conference terminal 120).

Applications 280 may comprise pulse masker 282, expression and respiration masker 284, voice masker 286, and pupil masker 288. Pulse masker 282 may be operative to detect and obfuscate components of video signals that may be used to determine a pulse for a video conference participant. Expression and respiration masker 284 may be operative to detect and obfuscate audio and/or video signals that may be used to detect micro expressions and/or respiration rates for a video conference participant. Voice masker 286 may be operative to detect and obfuscate audio signals that may be used to determine a voice stress level for a video conference participant. Pupil masker 288 may be operative to detect and obfuscate video signals that may be used to track eye movements for a video conference participant. That being said, the elements of applications 280 depicted in FIG. 2 may be exemplary; the embodiments described herein may support the allocation of the functionality of applications 280 into different sets of fewer, more, or different elements.

Video conference terminal 200 may also comprise circular buffer 285. In accordance with embodiments described herein, circular buffer 285 may be accessed by applications 280 while detecting and/or obfuscating biometric markers.

Circular buffer 285 may be instantiated in a suitable memory for storing data such as, for example, an optical storage medium, a magnetic storage medium, an electronic storage medium, and/or a combination thereof. As is described below, circular buffer 285 may be used to store recently observed replacement features that may be used by applications 280 to obfuscate or replace detected biometric markers.

Figure 3:
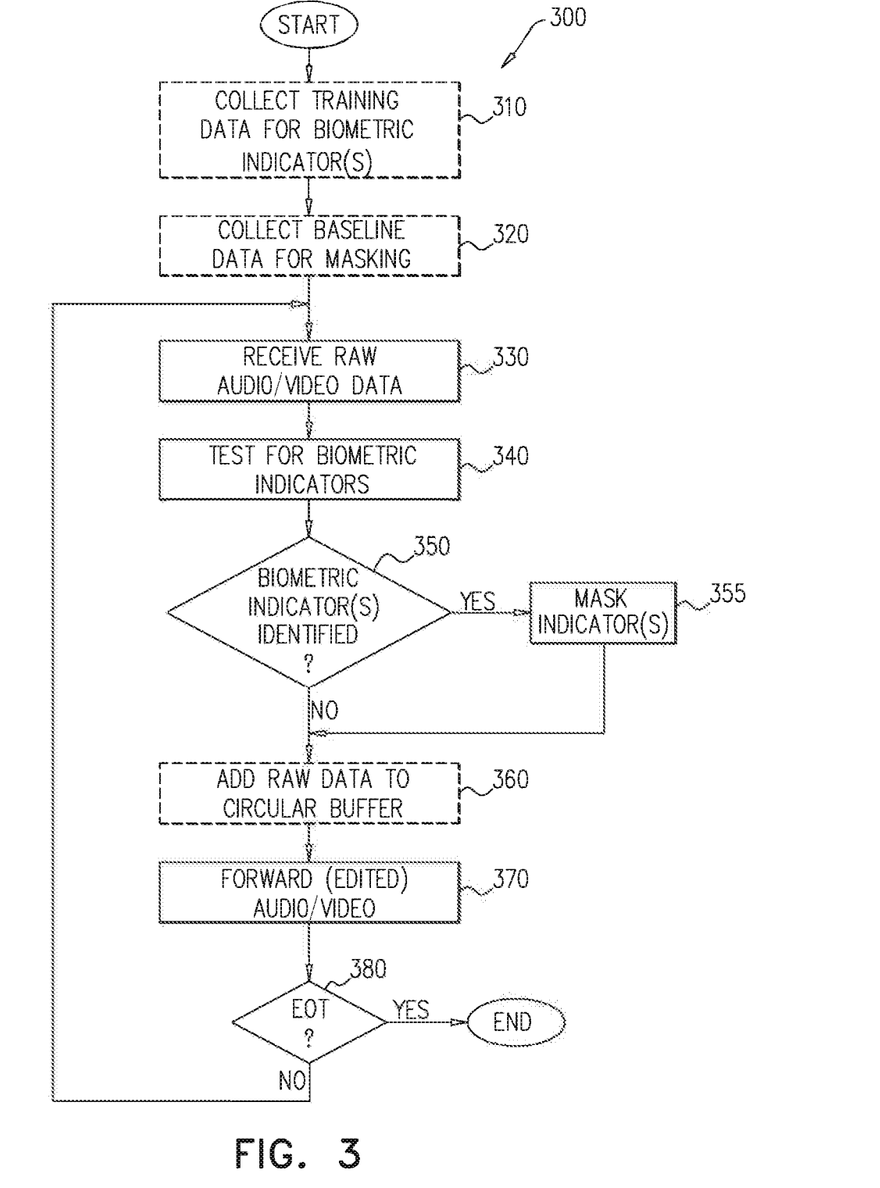
FIG. 3 is a flow chart of a method for biometric masking, according to an example embodiment.

Reference is now made also to FIG. 3 for a description of a flowchart depicting a method 300 to be performed by application(s) 280 of FIGS. 1 and 2 within the context of an ongoing video conference session. The components of system 100 and video conference terminal 200 will be referred to herein as per the reference numerals in FIGS. 1 and 2.

In accordance with some embodiments described herein, initially, applications 280 may optionally collect (step 310) training data for detecting biometric markers. For example, prior to connecting to the video conference session, applications 280 may instruct the user to perform a series of actions indicative of various emotional states, e.g., frowning, smiling, and various eye movements, etc. Applications 280 may then employ camera 240 and microphone 250 to record the actions. Alternatively, or in addition, a library of markers for such emotional states may be pre-cached for use during method 300 in a file storage unit (not shown) on video conference terminal 200.

Moreover, applications 280 may optionally collect (step 320) baseline data for masking biometric markers as they may be detected in the raw video and/or audio data of the ongoing video conference session. For example, prior to connecting to the video conference session, applications 280 may impose a wait period, e.g., thirty seconds, 60 seconds, etc. before beginning to forward audio and/or visual data to the other participants in the video conference session. During the wait period, applications 280 may employ camera 240 and microphone 250 to record baseline markers that may be indicative of a relaxed, or neutral, emotional state. For example, where the pulse and respiration rates of the user are typical of a resting state, or where the eyes are generally not moving and looking straight ahead. Camera 240 may also be used to record generally relaxed facial expressions that are associated with a relaxed emotional state. Additionally or alternatively, microphone 250 may record voice samples with baseline voice stress levels. The baseline data collected in step 320 may be stored in circular buffer 285 for use when masking a detected biometric marker.

Upon the start of the conference, applications 280 may receive (step 330) a raw data stream from an ongoing video conference session, e.g., video and/or audio data from camera 240 and/or microphone 250. Applications 280 may then test (step 340) for biometric markers in the raw video and/or audio data. For example, applications 280 may use pulse masker 282 to check for an increased pulse rate. The tests used in step 340 will be described in greater detail with respect to FIGS. 4-6.

If one or more biometric markers are identified (step 350), applications 280 may mask (step 355) the identified marker(s). For example, if an increased pulse rate is detected at 340, pulse masker 282 may be employed to mask the increased pulse rate in the outgoing video and/or audio data. The methods used in step 355 will also be described in greater detail with respect to FIGS. 4-6.

Applications 280 may add (step 360) raw (i.e., unedited) and/or masked (e.g., edited) audio and/or video data to circular buffer 285. For example, audio signals and/or facial features extracted from the most recent video and/or audio data may be stored in circular buffer 285 once these features are masked. However, since circular buffer 285 may be used to store very recent data, e.g., from the preceding thirty or sixty seconds, step 360 may also include deletion of the oldest data in circular buffer 285.

Video conference application 270 may forward (step 370) audio and/or video data to the other participant(s) of the video conference session, e.g., video conference terminal 120. This audio and/or video data may be based on the outcome of step 350. If step 355 was performed and at least one biometric marker was masked in audio and/or video data, then the outgoing audio and/or video data may be edited data, which is the output of step 355. If step 355 was not performed, then the outgoing audio and/or video data may be the raw data as received in step 330. However, notably, the decision rendered at 350 need not be identical for audio data and video data. That is, audio and video data from a certain time span does not need to be analyzed together; in some instances, video data may be edited to mask features while audio data remains unedited (raw) or vice versa.

If an end-of-transmission state has been reached (i.e., the video conference session has finished), method 300 may end. Otherwise, process control may loop back to step 330 to continue processing the audio and/or video data as it is received.

Figure 4:
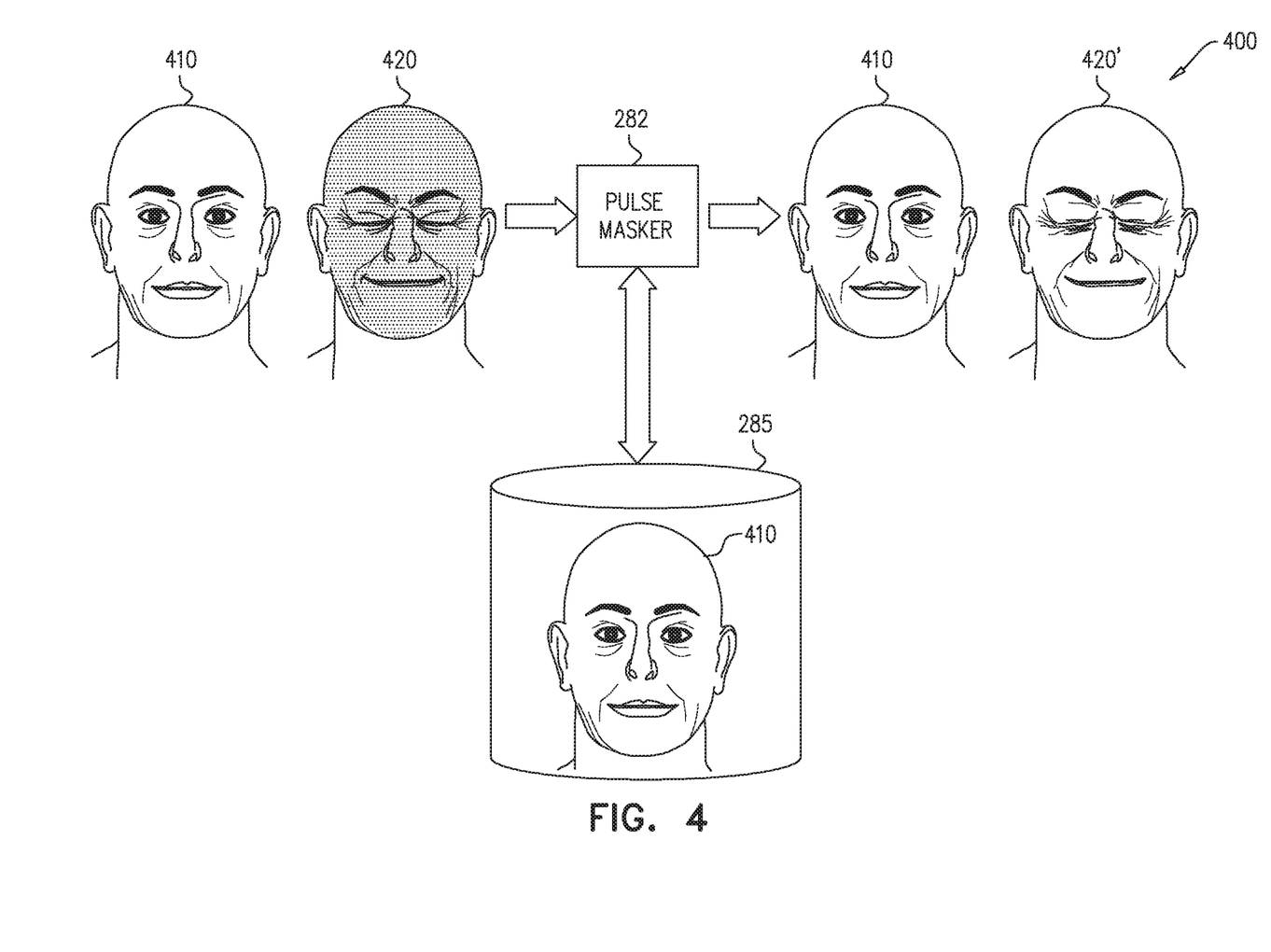
FIGS. 4-6 are diagrams illustrating exemplary video images processed in accordance with the method depicted in FIG. 3.

Reference is now made to FIG. 4 for a description of a diagram illustrating an exemplary facial image sequence 400 processed by pulse masker 282. The embodiment of FIG. 4 is described within the context of method 300 (FIG. 3). Facial images 410 and 420 represent a sequence of exemplary facial images received from a video conference participant in step 330. Applications 280 may employ any techniques now known or developed hereafter to detect facial images 410 and 420 in the raw video and/or audio data captured by camera 240. For example, applications 280 may be configured to use the OpenCV library to detect facial features in video images.

In FIG. 4, facial image 420 is shaded to represent a slight flush caused by the video conference participant's heartbeat. This flush may not actually be perceptible to the human eye when contrasted with facial image 410. However, the flush may be emphasized in facial image 420 in the order to provide a visual illustration for the operation of pulse masker 282 within the context of method 300. Additionally, in FIG. 4, the facial image 420 is shown squinting to emphasize the change in facial features between facial image 410 and facial image 420; however, the heartbeat-related flush (e.g., a "pulse flush") can also be detected independent of squinting. That is, a pulse flush can be detected independent of changes in geometry of a facial expression, facial expressions 410 and 420 are merely examples.

In step 340 of method 300, applications 280 may invoke pulse masker 282 to test for an elevated pulse rate. Pulse masker 282 may employ Eulerian video magnification to magnify a subtle color shift in a facial image captured by camera 240. For example, facial image 410 may represent a first facial image of a video conference participant whose heart has not pulsed during the specific frame time of the image capture. Accordingly, when pulse masker applies Eulerian video magnification to facial image 410, the associated color may remain generally constant. The result for the pulse rate test is therefore negative (step 350 of method 300), and applications 280 may store a copy of facial image 410 in circular buffer 285 for reference when testing succeeding facial images.

By comparison, when pulse masker 282 uses the copy of facial image 410 (in addition to, or instead of, earlier copies stored in circular buffer 285) for reference when applying Eulerian video magnification to facial image 420, the slight flush caused by a heartbeat in facial image 420 may be detected under the resulting magnification when compared to the stored copy of facial image 410. As part of step 340, pulse masker 282 may track positive indications of heartbeats over time (e.g., as a function of frames per second) in order to determine if and when the subject participant is experiencing an elevated pulse rate.

If pulse masker 282 determines that the subject participant is experiencing an elevated pulse rate, step 350 of method 300 may yield a positive result and pulse masker 282 may mask the elevated pulse rate in step 255, thereby producing facial image 420' which may be generally similar to facial image 420 with the exception that facial image 420' may not be indicative of a heartbeat. That is, facial image 420 may be edited to remove any flush coloring, without impacting the geometry of the facial image 420, to produce a facial image 420' that is substantially similar to facial image 420 in all aspects except for the flush coloring.

For example, pulse masker 282 may employ any techniques now known or developed hereafter for color replacement to mask the slight flush detected in facial image 420. The color in facial image 420 may be replaced with a neutral color from a previous frame (e.g., from the color in the copy of facial image 410 stored in circular buffer 285), or a histogram and color space for the video frames may be manipulated to mask the subtle, rhythmic color changes. This histogram modification may involve moving the chroma coordinates of selected portions of the facial image away from the red end of the spectrum to more closely match the face's non-flushed coloration. Alternatively, or in addition, pulse masker 282 may use a frame replacement approach which would entail replacing the video frames associated with heartbeats with adjacent video frames (e.g., the frame from which facial image 410 was extracted) with normal coloration. Alternatively, or in addition, pulse masker 282 may use a baseline profiling method which would use a baseline color range for the subject's skin tones (for example, as established during step 320 of method 300). If a pulse is detected (e.g., if the subject participant's skin tones deviate from the baseline), pulse masker 282 may modify the histogram of the facial image (e.g., facial image 420) to replace the flushed skin tones in the image back to the baseline skin tone shades.

In accordance with some embodiments described herein, subsequent to the performance of step 355, pulse masker 282 may be configured to perform step 340 again in order to confirm that the biometric marker for elevated pulse rate has been removed. Optionally, machine learning may also be used to determine whether or not there is a need for additional scrubbing passes to perform additional color shifts. That being said, in some instances, additional tests are performed (e.g., re-performance of step 340) based on the CPU (central processing unit) and GPU (graphic processing unit) resources available on video conference terminal 200.

In accordance with some embodiments described herein, pulse marker 282 may also be used to mask other biometric markers, in addition to an elevated pulse rate. For example, a persistent change in the color of a video conference participant's face may also indicate a particular emotional state. When a person's face turns red, it may indicate anger, excitement, physical stress, etc. Accordingly, if the tests run in step 340 of method 300 detect a persistent change in facial skin color (e.g., a persistent deviance in facial skin color for several consecutive facial images, as compared with a facial image in circular buffer 285 and/or with a baseline facial image acquired during step 320, is detected), pulse masker 282 may mask the change in color using color replacement, frame replacement, and/or baseline profiling as described hereinabove with respect to masking an elevated pulse rate. Additionally, since stress-induced perspiration may also result in a change of facial color as captured by camera 240, pulse masker 282 may also be operative to use similar methods to mask perspiration.

Figure 5:
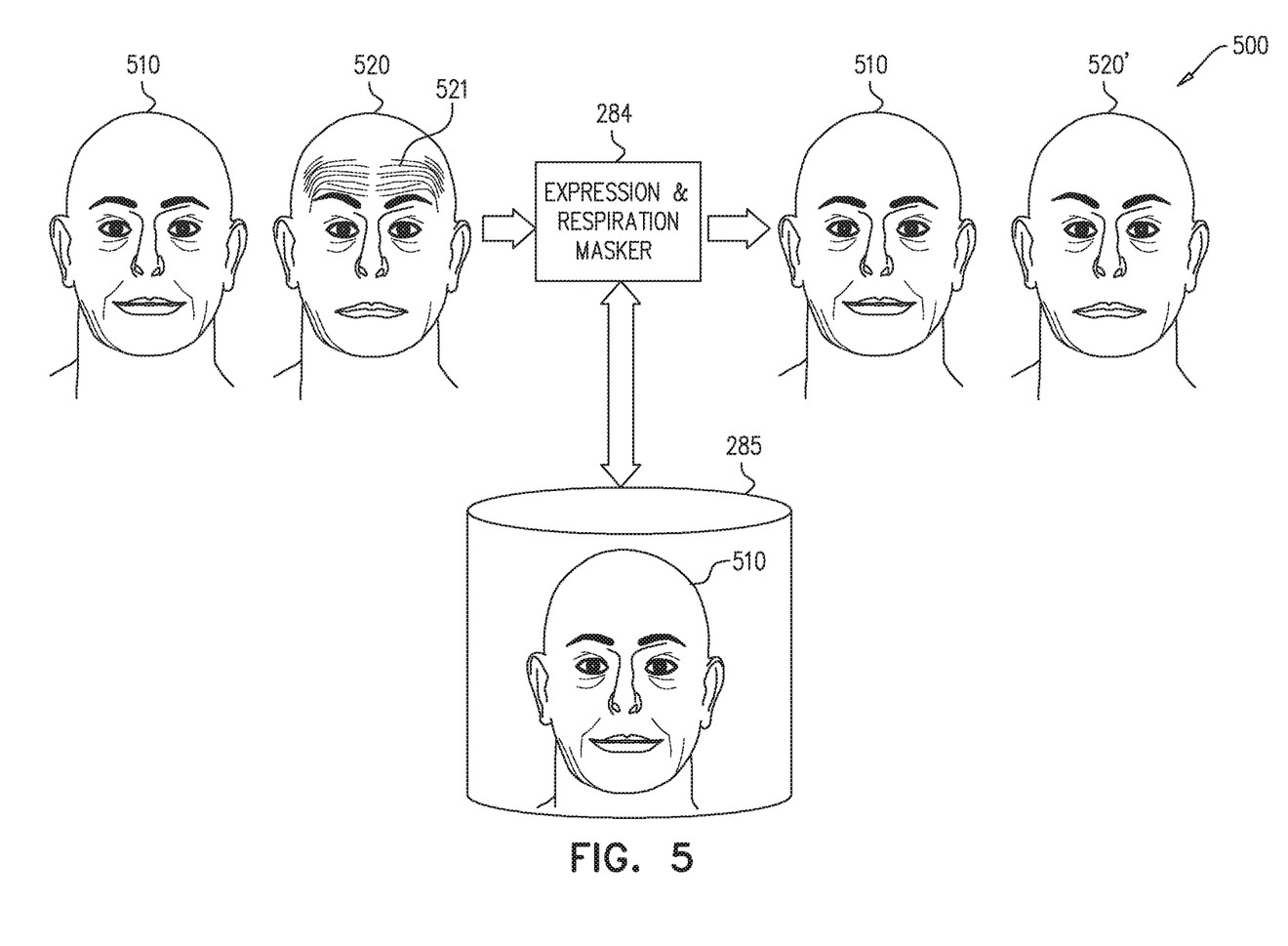

Reference is now made to FIG. 5 for a description of a diagram illustrating facial images sequence 500 processed by expression and respiration masker 284. The embodiment of FIG. 5 is described within the context of method 300 (FIG. 3). Facial images 510 and 520 represent a sequence of exemplary facial images received from a video conference participant in step 330. Applications 280 may employ any techniques now known or developed hereafter to detect facial images 510 and 520 in the raw video data captured by camera 240. For example, applications 280 may be configured to use the OpenCV library to detect facial features in video images. As another example, micro-expressions and respiration rates may be detected by running two dimensional (2D) Fourier transforms (or another similar transform) on incoming video frames, and comparing the results from sequences of adjacent frames.

Facial image 520 comprises brow crease 521 which represents a micro-expression. Generally, micro-expressions and respiration rates have biometric markers that may be extracted from video in a real-time manner. Micro-expressions are subtle, not necessarily perceptible, muscle movements in a person's face that represent not necessarily conscious manifestations of emotions and feelings. Respiration rates may indicate nervousness and stress and may be measured by the subtle movements of one's chest and shoulders in a repetitive manner. The embodiments described herein may support the detection and obfuscation of micro-expressions that may not be discernible to the human eye. However, brow crease 521 may be emphasized in facial image 520 in the order to provide a visual illustration for the operation of expression and respiration masker 284 within the context of method 300. Additionally, other facial features besides brow creases may also be detected and processed by expression and respiration masker 284.

In step 340 of method 300, applications 280 may invoke expression and respiration masker 284 to test for unusual micro-expressions and/or respiration rates that may be indicative of a video conference participant's emotional state. These biometric markers (i.e., micro-expressions and respiration movements) may have signatures in the Fast Fourier Transform (FFT) domain that may be learned and detected as a periodic signal. The biometric markers may be extracted from the video conference video data with two dimensional (2D) spatial-temporal filters. Accordingly, in step 340, expression and respiration masker 284 may apply a 2D FFT to the raw video data and analyze it in the frequency domain to detect micro-expressions and/or respiration movements, and use frequency-domain multi-dimensional filters to process the images, thereby resulting in edited facial image 520', where creased brow 521 has been removed. An edited facial image (e.g., image 520') is transmitted to the far end, thereby removing micro expressions from the now edited video frames.

Expression and respiration masker 284 may track respiration movements over time (e.g., as a function of frames per second) in order to determine a respiration rate for a subject video conference participant. The respiration rate may be compared to a previously observed respiration rate (either as a function of continuous observation, or in comparison to baseline respiration rate as observed in step 320). If expression and respiration masker 284 determines that the subject participant is experiencing an elevated respiration rate, step 350 of method 300 may yield a positive result, and in step 355 expression and respiration masker 284 may mask the elevated respiration rate by applying frequency-domain multi-dimensional filters, and then applying an inverse FFT to turn the video back to the time domain before transmission to the far end, thereby removing indication of the elevated respiration rate from the now edited video frames.

Expression and respiration masker 284 may compare detected micro-expressions, such as creased brow 521, to stored reference examples of micro-expressions to determine whether or not the detected micro-expression should be masked in step 355 The stored examples may be cached on video conference terminal 200 as part of a setup operation. Alternatively, or in addition, the stored examples may also be stored during step 310.

As described with respect to the operation of pulse masker 282, subsequent to the performance of step 355, expression and respiration masker 284 may be configured to perform step 340 again in order to confirm that the removal of the biometric marker(s) for elevated respiration rate and/or micro-expression. Optionally, machine learning may also be used to determine whether or not there is a need for additional scrubbing passes to perform additional FFTs. That being said, in some instances additional tests are performed (e.g., re-performance of step 340) based on the CPU resources available on video conference terminal 200.

Figure 6:
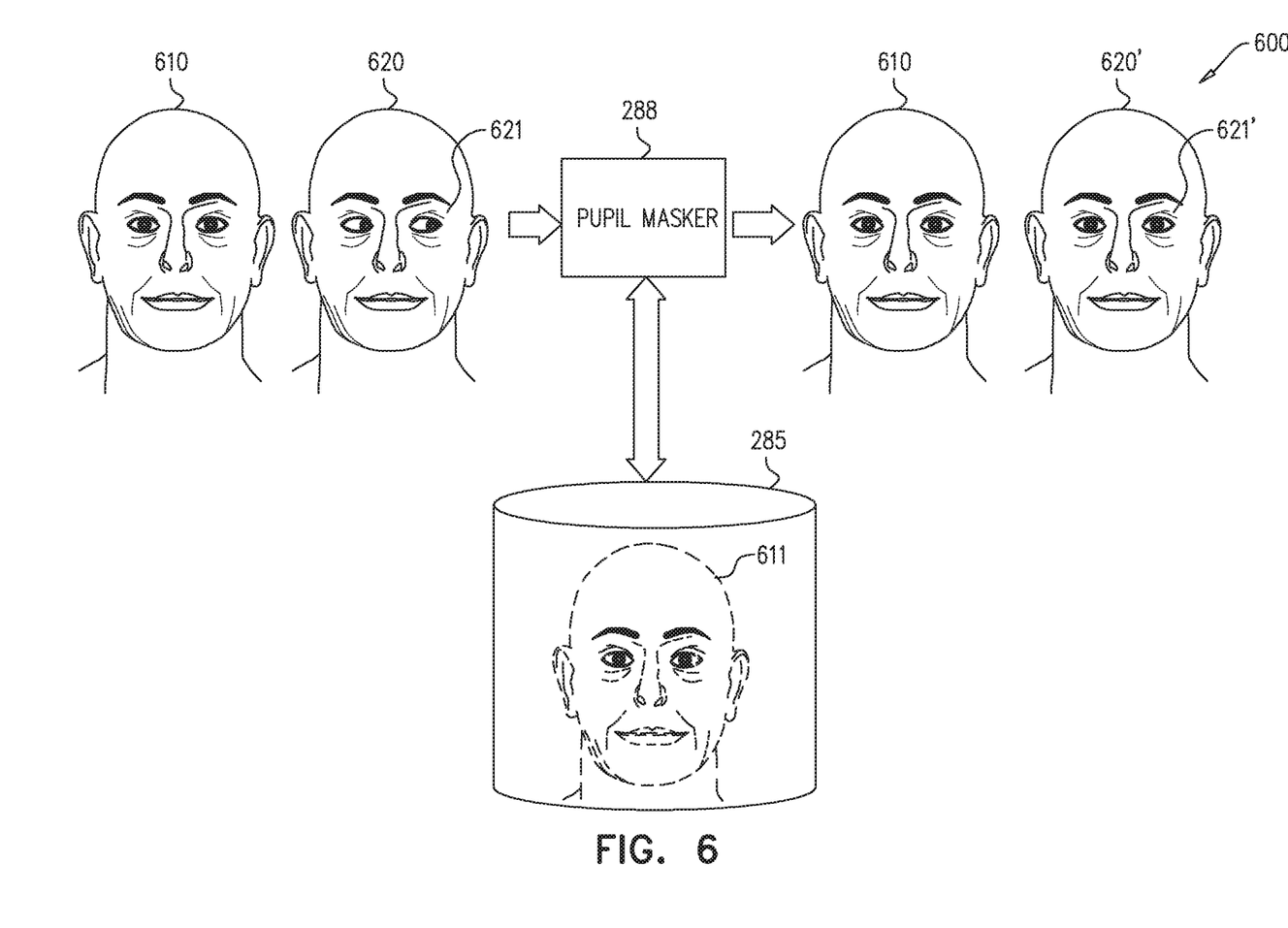

Reference is now made to FIG. 6 for a description of a diagram illustrating a facial images sequence 600 processed by pupil masker 288. The embodiment of FIG. 6 is described within the context of method 300 (FIG. 3). Facial images 610 and 620 represent a sequence of exemplary facial images received from a video conference participant in step 330. It Applications 280 may employ any techniques now known or developed hereafter to detect facial images 610 and 620 in the raw video data captured by camera 240. For example, applications 280 may be configured to use the OpenCV library to detect eyes in video images.

Facial image 610 represents an image of a video conference subject generally looking forward. In contrast, facial image 620 comprises pupils 621 which represents a sideways glance by the video conference subject. Sideways glances may be indicative of a lack of truthfulness by a video conference subject. That is, generally, certain pupil movements may reflect truthfulness. Pupil dilations may indicate emotion, stress, pain, or cognitive load. K Applications 280 may use techniques now known or developed hereafter to detect a video conference subject's pupil movements and/or dilations. For example, applications 280 may be configured to use the OpenCV library to detect and track facial features in video images. Put another way, applications 280 may employ pupil masker 288 to test for emotional signatures based on pupil movement and dilation patterns in a video stream. When an emotional signature is detected, pupil masker 288 may overlay a previously acquired image from circular buffer 285 into the correct location or size of the pupil in the outgoing video. Pupil masker 288 may continue the overlay process until the emotional signature is no longer present.

More specifically, in step 340 of method 300, applications 280 may invoke pupil masker 288 to test facial images 610 and 620 for pupil conditions that may be indicative of a video conference participant's emotional state. Pupil masker 288 may compare the pupils in facial images 610 and 620 to stored examples of reference pupils to determine whether or not the pupils in facial images 610 and/or 620 should be masked in step 355. The stored examples of reference pupils may include examples of various emotional states that were cached on video conference terminal 200 as part of a setup operation. Alternatively, or in addition, the stored examples may also be stored during step 310.

Pupil masker 288 may determine in step 350 that the pupils in facial image 610 indicate a normal emotional state for the video conference subject. Accordingly, step 355 of method 300 may not be performed, and in step 360, pupil masker 288 may store a copy of pupils 611 from facial image 610 in circular buffer 285. As is noted above, the data stored in circular buffer 285 may be recent data, e.g., data extracted from the preceding thirty or sixty seconds of video. Accordingly, in step 360 pupil masker 288 may also delete older data from circular buffer 285.

Pupil masker 288 may also determine that pupils 621 represent a biometric marker that should be masked. Accordingly, in step 255 pupil masker 288 may mask pupils 621 by replacing them with a portion of the copy of the facial image stored in circular buffer 285, e.g., pupils 611, thereby creating a new pupil image portion 621' free of emotional markers. The recent data stored in circular buffer 285 may be temporally related to facial images 610 and 610. Circular buffer 285 stores pupils captured by camera 240 at a similar distance with similar effects for lighting, reflection, and glare. Accordingly, the pupils retrieved from circular buffer 285 (e.g., pupils 611) may be similar enough to pupils 621 to be inserted in their place to remove the detected emotional signature while generally maintaining the visual integrity of the resulting facial image 620'.

In at least some embodiments, the pupil masker 288 may support the detection and removal of other emotional signatures associated with a video conference subject's pupils. For example, method 300 may also be used to detect and remove dilated pupils. Excessive eye blinking may also represent an emotional signature. Pupil masker 288 may therefore also be configured to detect blinks of an eye and track their frequency in order to identify such an emotional signature. Pupil masker 288 may then remove the excessive blinking using images from circular buffer 285.

It will be appreciated that many techniques for correcting pupils in an automated manner have been developed. These systems and methods typically focus on the detection and autonomous removal of red eyes that occur with flash photography. The techniques presented herein may be modify these red-eye removal techniques to provide pupil shifting or scaling, such that in accordance with some embodiments, pupil masker 288 may alternatively, or in addition, be configured to mask emotional signatures without using images from circular buffer 285.

Moreover, method 300 may not be limited to just obfuscating emotional signatures. Method 300 may also be used to replace a detected emotional signature with a different emotional signature in order to misrepresent a video conference subject's actual emotional state. For example, during an adversarial meeting (e.g., a merger and acquisition discussion or a court deposition), a first video conference participant (e.g., the user of video conference terminal 200 in FIG. 1) may suspect that a second participant (e.g., the user of video conference terminal 200 in FIG. 1) is employing some of the biometric detection techniques described herein to determine the emotional state of the first video conference participant. In response, the first video conference participant may employ applications 280 to not only remove/obfuscate emotional signatures from the raw video data, but to also specifically insert different emotional signatures into the outgoing masked video data.

Additionally or alternatively, in accordance with some embodiments, in step 355, method 300 may be configured to "spoof" the emotional state of the first video conference participant. For example, if the first video conference participant wishes to fake more excitement over the topic than is actually felt, pulse masker 282 may be configured to use color replacement, frame replacement, and/or baselining profiling to simulate a higher pulse rate (e.g., 20 BPM (beats per minute) faster than actual). Similarly, if the first video conference participant is about to say something that may be untruthful, pulse masker 282 may be configured to use the methods described herein to imprint the outgoing video data with biometric markers associated with calm truthfulness in order to mislead any far end biometric analyzers and the video conference participants using them.

Similarly, expression and respiration masker 284 and/or pupil masker 288 may also be configured to spoof an emotional state in step 355. For example, expression and respiration masker 284 may be configured to insert false movement into the video of a video conference to simulate an artificial emotional state, e.g., by increasing or decreasing a respiration rate and/or editing the video to include micro-expressions reflecting a particular emotional state per a selection by the video conference participant. Similarly, pupil masker 288 may be configured to imprint the video with a representation of pupils that may be consistent with a particular emotional state.

Voice stress patterns may also be useful in the evaluation of truthfulness; as evidenced by recent advances in the use of voice stress analysis to detect lies. In accordance with some embodiments described herein, voice masker 286 may be configured to support obfuscation, masking, or spoofing of biometric markers in audio.

For example, in step 340 of method 300, voice masker 286 may temporarily buffer outgoing speech, detect voice stress components, and use signal processing techniques to remove the voice stress markers such as subtle pitch variations. Voice masker 286 may then use signal processing to replace the original levels of voice stress with new voice waveforms exhibiting whatever degree of voice stress the user wishes. Any techniques now known or developed hereafter may be utilized to learn a subject's voice with about a minute of samples. The systems and methods may then generate speech using the learned voice. Such systems and methods may be adapted for use by voice masker 286 to overwrite detected voice stress patterns in step 285.

In accordance with some embodiments described herein, applications 280 may also comprise feedback functionality (not shown) for providing biometric feedback to video conference participants. The biometric data analyzed by applications 280 may be combined to provide a score or metric that may be used in a graphic or numeric value that may show video conference participants how they are coming across in areas like calmness, nervousness, sincerity, credibility, and so on, i.e., a form of real-time biofeedback. This may help individuals to understand how they are being perceived by others. At the same time, this data may be provided in real time to one video conference participant about other video conference participants in a video conference. Furthermore, under some circumstances, it may provide an advantage to send the biometric analysis results through a side-channel to individual desktops, mobile devices, AR/VR (augmented reality/virtual reality) headsets or wearables to provide more private alerts or graphical outputs to only a subset of the meeting participants, without necessarily disclosing them to other participants. Haptic alerts could also be employed (i.e. having a smart watch tap a user's wrist if a preset threshold for a measurable state such as truthfulness is crossed by far-end conference participants).

The embodiments described herein for analyzing the various biometrics in a video stream in real-time may require additional processing power (mainly by a graphic processing unit—GPU). This processing power may be implemented locally (e.g., as part of processing circuitry 210) or in fog/edge/cloud computer resources. Alternatively, or in addition, the processing power may be integrated into telepresence endpoints, conference controllers, or external servers that are connected on demand (rather like recording servers are applied today). The video and audio streams may be forked and sent to a biometric analytics and processing system (e.g., a non-integrated implementation of applications 280) where the requested biometrics may be removed before the video is streamed to remote parties.

The embodiments described herein may add additional delay to the video and audio streams. However, based on the trending of current CPU and GPU speeds the additional delay may not exceed a few milliseconds, which may not appreciably affect a user's experience in a video conference.

In summary, in one form, an apparatus is provided comprising: a camera configured to capture video for a video conference; an input/output (I/O) module to transmit data to and receive data from a video conference server hosting the video conference; processing circuitry; and a biometric detection and obfuscation application comprising at least one of: a pulse masker to be executed by the processing circuitry and operative to detect and obfuscate facial coloration of a participant in the video that is indicative of a pulse rate of the participant; an expression and respiration masker to be executed by the processing circuitry and operative to detect and obfuscate a micro-expression and/or a respiration rate for the participant in the video; and a pupil masker to be executed by the processing circuitry and operative to detect and obfuscate a pupil size and/or a pupil movement in the video for the participant.

In another form, a method for obfuscating biometric markers in a video conference is provided, the method implemented on a computing device and comprising: testing video data and/or audio data from the video conference for biometric markers indicative of emotion or stress levels; upon detecting at least one of the biometric markers with the testing, editing the video data and/or the audio data to obfuscate the at least one of the biometric markers; and transmitting the video data and the audio data to participants of the video conference with the at least one of the biometric markers obfuscated.

In yet another form, one or more non-transitory computer readable storage media are provided encoded with software comprising computer executable instructions and when the software is executed operable to: test video data and/or audio data from a video conference session for biometric markers indicative of emotion or stress levels; upon detecting at least one of the biometric markers with the testing, edit the video data and/or the audio data to obfuscate the at least one of the biometric markers; and transmit the video data and the audio data to participants of the video conference with the at least one of the biometric markers obfuscated.

Still further, in another form, a system is presented herein, the system comprising a video conference server operable to host a video conference session; a first terminal configured to participate in the video conference session; and a second terminal configured to participate in the video conference session, the second terminal including a processor configured to execute instructions stored in memory in order to: detect biometric markers in video data and/or audio data captured at the second terminal; and obfuscate the biometric markers prior to transmitting the audio data and/or the video data to the second terminal via the video conference server.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

Various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

The embodiments of the disclosure are not limited by what has been particularly shown and described hereinabove. Rather the scope of the embodiments of the disclosure is defined by the appended claims and equivalents thereof:

What is claimed is:

1. An apparatus comprising:
  a camera configured to:
    capture sample video data during a setup period when a user becomes a participant of a video conference, wherein the sample video data is not transmitted to other participants of the video conference; and
    capture video data of the participant during the video conference;
  an input/output module to transmit data to and receive data from a video conference server hosting the video conference;
  processing circuitry; and
  a biometric detection and obfuscation application configured to derive baseline data from the sample video data, the biometric detection and obfuscation application comprising at least one of:
    a pulse masker to be executed by the processing circuitry and operative to detect and obfuscate facial coloration of the participant in the video data that is indicative of a pulse rate of the participant, the facial coloration being detected based on a comparison of the video data to the baseline data;
    an expression and respiration masker to be executed by the processing circuitry and operative to detect and obfuscate a micro-expression and/or a respiration rate for the participant in the video data, the micro-expression and/or the respiration rate being detected based on a comparison of the video data to the baseline data; and
    a pupil masker to be executed by the processing circuitry and operative to detect and obfuscate a pupil size change and/or a pupil movement in the video data for the participant, the pupil size change and/or a pupil movement being detected based on a comparison of the video data to the baseline data.

2. The apparatus according to claim 1 further comprising:
  a microphone configured to:
    capture sample audio data during the setup period, wherein the sample audio data is not transmitted to the other participants of the video conference; and
    capture audio data during the video conference; and
  wherein the biometric detection and obfuscation application further derives the baseline data from the sample audio data and further comprises a voice masker to be executed by the processing circuitry and operative to detect and obfuscate voice stress markers in the audio data, the voice stress markers being detected based on a comparison of the audio data to the baseline data.

3. The apparatus according to claim 1 further comprising:
  a circular buffer to store recent observations of the biometric detection and obfuscation application so that the biometric detection and obfuscation application can utilize the recent observations for detections and obfuscations.

4. The apparatus according to claim 1, wherein the expression and respiration masker utilizes a reference example to obfuscate the micro-expression.

5. The apparatus according to claim 4, wherein the expression and respiration masker is configured to imprint faces in the video data with the reference example.

6. The apparatus according to claim 1 wherein the expression and respiration masker is configured to imprint the video data with slight movements indicative of respiration to simulate an obfuscated respiration rate that is different from the respiration rate of the participant.

7. The apparatus according to claim 1 wherein the pulse masker is configured to edit the facial coloration to simulate an obfuscated pulse rate for the participant that is different from the pulse rate of the participant.

8. A method for obfuscating biometric markers in a video conference, the method implemented on a computing device and comprising:
  capturing sample video data and/or sample audio data during a setup period when a user becomes a participant of a video conference, wherein the sample video data and the sample audio data is not transmitted to other participants of the video conference;
  deriving baseline data from the sample video data and/or the sample audio data;
  testing video data and/or audio data from during the video conference for biometric markers indicative of emotion or stress levels by comparing the video data and/or the audio data to the baseline data;
  upon detecting at least one of the biometric markers with the testing, editing the video data and/or the audio data to obfuscate the at least one of the biometric markers; and
  transmitting the video data and/or the audio data to the other participants of the video conference with the at least one of the biometric markers obfuscated.

9. The method according to claim 8 wherein:
  the testing comprises detecting changes in facial color indicative of a pulse rate of the participant; and
  the editing comprises at least one of: replacing the facial color with a neutral color from a previous video frame in the video data, or manipulating a histogram and color space for a current video frame associated with the changes.

10. The method according to claim 8 wherein:
  the testing comprises detecting changes in facial color indicative of a pulse rate of the participant; and the editing comprises replacing a current video frame associated with the changes with a previous video frame in which the changes were not detected.

11. The method according to claim 8 wherein:
the testing comprises detecting changes in facial color indicative of a pulse rate of the participant; and
the editing comprises replacing the facial color with a baseline color from the baseline data.

12. The method according to claim 8 wherein the biometric markers include at least one of pupil movement and pupil size.

13. The method according to claim 12 further comprising:
extracting pupil data from recent observations of pupils in the video data;
storing the pupil data in a circular buffer that is configured to store data from a predetermined period of time prior to the testing; and
using the pupil data to obfuscate at least one of the pupil movement and the pupil size.

14. The method according to claim 8 further comprising:
performing the testing and the editing iteratively until the biometric markers are not detected in the testing.

15. The method according to claim 8 wherein the testing further comprises:
testing for movements consistent with breathing;
tracking a breathing rate according to the testing for movements; and
detecting a biometric marker associated with respiration rate according to the tracking and the baseline data.

16. The method according to claim 8 wherein the editing comprises editing the video data to imprint non-detected biometric markers into the video data.

17. One or more non-transitory computer readable storage media encoded with software comprising computer executable instructions and when the software is executed operable to:
capture sample video data and/or sample audio data during a setup period when a user becomes a participant of a video conference, wherein the sample video data and the sample audio data is not transmitted to other participants of the video conference;
derive baseline data from the sample video data and/or the sample audio data;
test video data and/or audio data from during a video conference session for biometric markers indicative of emotion or stress levels by comparing the video data and/or the audio data to the baseline data;
upon detecting at least one of the biometric markers with the testing, edit the video data and/or the audio data to obfuscate the at least one of the biometric markers; and
transmit the video data and/or the audio data to the other participants of the video conference with the at least one of the biometric markers obfuscated.

18. The non-transitory computer readable storage media of claim 17, wherein the biometric markers comprise at least one of: voice stress markers; a pulse rate; a micro-expression; a respiration rate; a pupil size; or a pupil movement.

19. The non-transitory computer readable storage media of claim 17, wherein the instructions operable to edit are operable to edit the video data to imprint non-detected biometric markers into the video data.

20. The non-transitory computer readable storage media of claim 17, further comprising instructions operable to:
store the video data from during the video conference session in a circular buffer that is configured to store data from a predetermined period of time.

* * * * *